US011954188B1

United States Patent
Duke et al.

(10) Patent No.: US 11,954,188 B1
(45) Date of Patent: *Apr. 9, 2024

(54) SYSTEMS AND METHODS FOR DYNAMIC BIO-BEHAVIORAL AUTHENTICATION

(71) Applicant: Wells Fargo Bank, N.A., San Francisco, CA (US)

(72) Inventors: Mike Duke, San Francisco, CA (US); Kourtney Eidam, San Francisco, CA (US); Ross Goddard, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/385,649

(22) Filed: Jul. 26, 2021

Related U.S. Application Data

(63) Continuation of application No. 15/468,328, filed on Mar. 24, 2017, now Pat. No. 11,074,325.

(Continued)

(51) Int. Cl.
*G06F 21/31* (2013.01)
*G06F 21/32* (2013.01)
(Continued)

(52) U.S. Cl.
CPC ............ *G06F 21/316* (2013.01); *G06F 21/32* (2013.01); *G06Q 20/1085* (2013.01); *G06Q 20/3224* (2013.01); *G06Q 20/40145* (2013.01); *G06Q 20/4016* (2013.01); *H04L 63/0861* (2013.01); *H04L 63/102* (2013.01); *H04L 2463/082* (2013.01)

(58) Field of Classification Search
None
See application file for complete search history.

(56) References Cited

U.S. PATENT DOCUMENTS

| | | | | |
|---|---|---|---|---|
| 5,764,789 A | * | 6/1998 | Pare, Jr. ................. | G06Q 20/10 382/224 |
| 5,822,436 A | * | 10/1998 | Rhoads ............ | G06K 19/06037 380/54 |

(Continued)

OTHER PUBLICATIONS

Singh et al "A Constraint-based Biometric Scheme on ATM and Swiping Machine," 2016 International Conference on Computational Techniques in Information and Communication Technologies (ICCTICT), pp. 1-6 (Year: 2016).*

(Continued)

*Primary Examiner* — Luu T Pham
*Assistant Examiner* — James J Wilcox
(74) *Attorney, Agent, or Firm* — Foley & Lardner LLP

(57) ABSTRACT

An automated teller machine comprising a sensor, a network interface, and a processor configured to receive, during a transaction at the automated teller machine, user data from the sensor configured to monitor user movement information during the transaction, receive, via the network interface, user data from a mobile device, determine a risk of a fraudulent transaction based on a comparison of the user movement information from the sensor and the user data from the mobile device to expected parameters, determine that the risk of a fraudulent transaction is below a threshold, and allow access to a secure resource at the automated teller machine.

17 Claims, 6 Drawing Sheets

Related U.S. Application Data

(60) Provisional application No. 62/419,816, filed on Nov. 9, 2016.

(51) Int. Cl.
  *G06Q 20/10* (2012.01)
  *G06Q 20/32* (2012.01)
  *G06Q 20/40* (2012.01)
  *H04L 9/40* (2022.01)

(56) References Cited

U.S. PATENT DOCUMENTS

| | | | | |
|---|---|---|---|---|
| 5,832,119 A * | 11/1998 | Rhoads | G11B 20/00094 | 704/E19.009 |
| 5,862,260 A * | 1/1999 | Rhoads | G11B 20/00166 | 707/E17.112 |
| 6,122,403 A * | 9/2000 | Rhoads | H04B 1/665 | 704/E19.009 |
| 6,263,447 B1 * | 7/2001 | French | G06F 21/33 | 726/5 |
| 6,308,887 B1 * | 10/2001 | Korman | G06Q 20/18 | 902/4 |
| 6,321,339 B1 * | 11/2001 | French | G06F 21/33 | 726/2 |
| 6,424,727 B1 * | 7/2002 | Musgrave | H04M 1/67 | 382/116 |
| 6,505,193 B1 * | 1/2003 | Musgrave | G06F 21/32 | |
| 6,813,366 B1 * | 11/2004 | Rhoads | H04N 1/32288 | 707/E17.112 |
| 6,879,701 B1 * | 4/2005 | Rhoads | G11B 20/0021 | 707/E17.112 |
| 7,093,749 B1 * | 8/2006 | Block | G07F 19/206 | 902/8 |
| 7,093,750 B1 * | 8/2006 | Block | G07F 19/20 | 902/8 |
| 7,389,914 B1 * | 6/2008 | Enright | G06Q 20/042 | 705/45 |
| 7,404,515 B1 * | 7/2008 | Shepley | G06F 9/465 | 902/8 |
| 7,533,806 B1 * | 5/2009 | Enright | G06Q 40/00 | 235/379 |
| RE40,919 E * | 9/2009 | Rhoads | H04N 1/00037 | 707/E17.112 |
| 7,595,816 B1 * | 9/2009 | Enright | G06Q 20/40145 | 348/150 |
| 7,620,596 B2 | 11/2009 | Knudson | G06Q 40/03 | 705/38 |
| 7,813,822 B1 * | 10/2010 | Hoffberg | H04N 7/163 | 381/73.1 |
| 7,866,544 B1 * | 1/2011 | Block | G06Q 20/18 | 235/379 |
| 7,921,297 B2 | 4/2011 | Ortiz et al. | | |
| 7,926,710 B1 * | 4/2011 | Griswold | G07F 19/20 | 235/379 |
| 7,942,313 B1 * | 5/2011 | Grimm | G06Q 20/042 | 705/40 |
| 7,942,314 B1 * | 5/2011 | Grimm | G06Q 40/02 | 705/40 |
| 7,980,462 B1 * | 7/2011 | Graef | G06Q 20/382 | 235/487 |
| 8,161,530 B2 * | 4/2012 | Meehan | G06Q 20/40145 | 726/4 |
| 8,220,706 B1 * | 7/2012 | Miller | G06Q 20/18 | 235/379 |
| 8,311,863 B1 * | 11/2012 | Kemp | G06Q 10/0639 | 705/7.29 |
| 8,437,532 B1 * | 5/2013 | Jones | G07D 7/04 | 382/138 |
| 8,474,709 B2 | 7/2013 | Blackson et al. | | |
| 8,494,961 B1 * | 7/2013 | Lucas | G06Q 20/40145 | 705/40 |
| 8,840,016 B1 * | 9/2014 | Schott | G06Q 20/3278 | 235/379 |
| 8,970,348 B1 | 3/2015 | Evans et al. | | |
| 8,988,186 B1 * | 3/2015 | Dent | G07F 19/20 | 705/16 |
| 9,185,095 B1 | 11/2015 | Moritz et al. | | |
| 9,189,613 B1 * | 11/2015 | Tuthill | G06Q 20/40 | |
| 9,355,530 B1 * | 5/2016 | Block | G06Q 20/405 | |
| 9,800,570 B1 * | 10/2017 | Bleisch | H04W 12/082 | |
| 9,805,213 B1 * | 10/2017 | Kragh | G06F 16/245 | |
| 10,019,561 B1 * | 7/2018 | Shelton | G10L 17/24 | |
| 10,108,791 B1 * | 10/2018 | Masterman | G06F 21/316 | |
| 10,142,308 B1 * | 11/2018 | Duchin | H04L 63/08 | |
| 10,219,154 B1 * | 2/2019 | Hallock | H04L 63/0876 | |
| 10,303,869 B1 * | 5/2019 | Duke | G06F 21/36 | |
| 10,360,560 B2 * | 7/2019 | Bryant | G06Q 20/4014 | |
| 10,395,018 B2 * | 8/2019 | Turgeman | H04L 63/0861 | |
| 10,546,107 B2 * | 1/2020 | Alderucci | G06F 21/31 | |
| 11,010,706 B1 * | 5/2021 | Wier | G06Q 10/0837 | |
| 2001/0001877 A1 * | 5/2001 | French | G06Q 40/03 | 713/182 |
| 2001/0019618 A1 * | 9/2001 | Rhoads | G06K 19/06037 | 704/E19.009 |
| 2001/0026632 A1 * | 10/2001 | Tamai | G06Q 20/341 | 382/116 |
| 2002/0174347 A1 * | 11/2002 | Ting | G06F 21/57 | 713/186 |
| 2003/0002710 A1 * | 1/2003 | Rhoads | G06K 19/18 | 707/E17.112 |
| 2003/0016770 A1 * | 1/2003 | Trans | H04B 3/32 | 375/346 |
| 2003/0031341 A1 * | 2/2003 | Rhoads | G11B 20/00166 | 707/E17.112 |
| 2003/0046231 A1 | 3/2003 | Wu | | |
| 2003/0086585 A1 * | 5/2003 | Rhoads | G07F 7/1016 | 704/E19.009 |
| 2003/0102660 A1 * | 6/2003 | Rhoads | G06Q 20/341 | 283/72 |
| 2003/0115154 A1 * | 6/2003 | Anderson | G06Q 20/382 | 705/73 |
| 2003/0208439 A1 * | 11/2003 | Rast | G06Q 20/403 | 705/38 |
| 2004/0149818 A1 * | 8/2004 | Shepley | G07F 19/207 | 235/379 |
| 2004/0149819 A1 * | 8/2004 | Shepley | G07F 19/209 | 235/379 |
| 2004/0153409 A1 * | 8/2004 | Shepley | G06Q 20/1085 | 705/43 |
| 2005/0196013 A1 * | 9/2005 | Rhoads | G06V 30/40 | 704/E19.009 |
| 2005/0263585 A1 * | 12/2005 | Schlabach | G07F 19/206 | 235/379 |
| 2005/0281439 A1 | 12/2005 | Lange | | |
| 2006/0188128 A1 * | 8/2006 | Rhoads | G06F 16/955 | 382/100 |
| 2006/0229090 A1 * | 10/2006 | LaDue | H04W 84/04 | 455/507 |
| 2006/0273151 A1 * | 12/2006 | Block | G07F 19/209 | 235/379 |
| 2007/0067297 A1 * | 3/2007 | Kublickis | G06Q 30/02 | 707/999.009 |
| 2007/0203826 A1 * | 8/2007 | Russell | G06Q 20/4016 | 705/38 |
| 2007/0236330 A1 | 10/2007 | Cho et al. | | |
| 2007/0239518 A1 | 10/2007 | Chung et al. | | |
| 2007/0250920 A1 * | 10/2007 | Lindsay | G06F 21/31 | 726/7 |
| 2008/0040276 A1 * | 2/2008 | Hammad | G06Q 20/385 | 705/44 |
| 2008/0104415 A1 * | 5/2008 | Palti-Wasserman | G06V 40/197 | 382/117 |
| 2008/0288405 A1 * | 11/2008 | John | G06Q 20/384 | 705/44 |
| 2009/0132395 A1 * | 5/2009 | Lam | G06F 16/9535 | 705/30 |

(56) References Cited

U.S. PATENT DOCUMENTS

| | | | |
|---|---|---|---|
| 2009/0189736 A1* | 7/2009 | Hayashi | G06F 21/32 340/5.81 |
| 2010/0012718 A1* | 1/2010 | Griswold | G07F 19/20 235/379 |
| 2010/0030821 A1* | 2/2010 | Brown | G06F 16/00 707/E17.007 |
| 2010/0059587 A1* | 3/2010 | Miller | G06Q 40/02 235/379 |
| 2011/0185421 A1* | 7/2011 | Wittenstein | H04L 63/1425 726/22 |
| 2011/0214187 A1* | 9/2011 | Wittenstein | H04L 61/301 726/25 |
| 2011/0295722 A1* | 12/2011 | Reisman | G06Q 30/0641 705/26.1 |
| 2011/0302653 A1* | 12/2011 | Frantz | G06F 21/552 726/22 |
| 2012/0097739 A1* | 4/2012 | Babu | G06Q 40/02 235/449 |
| 2012/0097740 A1* | 4/2012 | Lamba | G06Q 40/02 235/449 |
| 2012/0118956 A1* | 5/2012 | Lamba | G06Q 20/3226 235/437 |
| 2012/0118959 A1* | 5/2012 | Sather | G06Q 30/06 235/449 |
| 2012/0118960 A1* | 5/2012 | Sather | G06Q 40/02 235/449 |
| 2012/0124496 A1* | 5/2012 | Rose | G06Q 20/3224 715/763 |
| 2012/0223134 A1* | 9/2012 | Smith | G06V 30/224 235/379 |
| 2012/0246079 A1* | 9/2012 | Wilson | G06Q 20/3226 705/67 |
| 2012/0260307 A1* | 10/2012 | Sambamurthy | H04L 63/105 726/1 |
| 2013/0024358 A1* | 1/2013 | Choudhuri | G06Q 20/4016 705/38 |
| 2013/0046692 A1 | 2/2013 | Grigg et al. | |
| 2013/0102283 A1 | 4/2013 | Lau et al. | |
| 2013/0133055 A1 | 5/2013 | Ali et al. | |
| 2013/0145482 A1* | 6/2013 | Ricci | H04W 4/50 726/28 |
| 2013/0146659 A1* | 6/2013 | Zhou | G06Q 20/321 235/380 |
| 2013/0159049 A1* | 6/2013 | Arumugam | G06Q 10/063 705/7.28 |
| 2013/0173926 A1* | 7/2013 | Morese | G16B 99/00 713/186 |
| 2013/0200147 A1* | 8/2013 | Dorsey | G06Q 40/02 235/449 |
| 2013/0200148 A1* | 8/2013 | Dorsey | G06K 7/082 235/449 |
| 2013/0200149 A1* | 8/2013 | Dorsey | G06Q 20/3224 235/380 |
| 2013/0200153 A1* | 8/2013 | Dorsey | G06Q 20/40 235/449 |
| 2013/0200154 A1* | 8/2013 | Dorsey | G06Q 20/40 235/449 |
| 2013/0204785 A1* | 8/2013 | Monk | G06Q 20/326 705/44 |
| 2013/0204788 A1* | 8/2013 | Dorsey | G06Q 20/322 705/44 |
| 2013/0204791 A1* | 8/2013 | Dorsey | G06Q 20/3226 705/44 |
| 2013/0204792 A1* | 8/2013 | Dorsey | G07F 7/0886 705/44 |
| 2013/0246272 A1* | 9/2013 | Kirsch | G06Q 20/401 705/44 |
| 2013/0267204 A1* | 10/2013 | Schultz | G06F 21/32 455/411 |
| 2013/0332362 A1* | 12/2013 | Ciurea | G06Q 20/384 705/44 |
| 2013/0346142 A1* | 12/2013 | Young | G06Q 10/0635 705/7.28 |
| 2014/0006202 A1* | 1/2014 | Frohwein | G06Q 40/03 705/26.3 |
| 2014/0039990 A1* | 2/2014 | Georgi | G06Q 30/0229 705/14.3 |
| 2014/0040134 A1* | 2/2014 | Ciurea | G06Q 20/383 705/44 |
| 2014/0046842 A1* | 2/2014 | Irudayam | G06Q 20/32 235/379 |
| 2014/0067679 A1* | 3/2014 | O'Reilly | G06Q 20/40145 705/44 |
| 2014/0074696 A1* | 3/2014 | Glaser | G06F 21/32 726/19 |
| 2014/0081665 A1* | 3/2014 | Holmes | G06F 21/32 705/3 |
| 2014/0085050 A1* | 3/2014 | Luna | H04W 12/33 340/5.82 |
| 2014/0089673 A1* | 3/2014 | Luna | H04L 63/0861 713/186 |
| 2014/0107836 A1* | 4/2014 | Crews | G07F 19/209 700/236 |
| 2014/0122305 A1* | 5/2014 | Cherry | G06Q 20/405 705/30 |
| 2014/0129423 A1* | 5/2014 | Murphy | G06Q 20/10 705/39 |
| 2014/0129424 A1* | 5/2014 | Murphy | G06Q 30/0283 705/39 |
| 2014/0129443 A1* | 5/2014 | Whitler | G06Q 20/085 705/44 |
| 2014/0183269 A1* | 7/2014 | Glaser | G06K 19/07701 235/492 |
| 2014/0229002 A1* | 8/2014 | Graef | G06Q 20/1085 235/492 |
| 2014/0239065 A1* | 8/2014 | Zhou | G06F 1/1677 235/380 |
| 2014/0279490 A1 | 9/2014 | Calman et al. | |
| 2014/0279503 A1 | 9/2014 | Bertanzetti et al. | |
| 2014/0279534 A1* | 9/2014 | Miles | G06Q 20/4016 705/44 |
| 2014/0289833 A1* | 9/2014 | Briceno | H04L 9/006 726/5 |
| 2014/0297268 A1* | 10/2014 | Govrin | G06N 5/02 704/9 |
| 2014/0317744 A1* | 10/2014 | Turgeman | H04W 12/122 726/23 |
| 2014/0325223 A1* | 10/2014 | Turgeman | G06F 21/31 713/168 |
| 2014/0325645 A1* | 10/2014 | Turgeman | G06F 3/04892 726/22 |
| 2014/0325646 A1* | 10/2014 | Turgeman | G06F 21/316 726/22 |
| 2014/0325682 A1* | 10/2014 | Turgeman | G06F 21/316 726/29 |
| 2014/0333524 A1* | 11/2014 | Liu | G06F 3/0488 345/156 |
| 2014/0337243 A1* | 11/2014 | Dutt | G06Q 20/327 705/325 |
| 2014/0337920 A1* | 11/2014 | Giobbi | H04W 12/08 726/3 |
| 2014/0337930 A1* | 11/2014 | Hoyos | G06F 21/34 726/4 |
| 2014/0344927 A1* | 11/2014 | Turgeman | G06F 21/31 726/22 |
| 2014/0351125 A1* | 11/2014 | Miller | G06Q 40/02 235/379 |
| 2015/0012436 A1* | 1/2015 | Poole | G06Q 20/34 705/44 |
| 2015/0019266 A1* | 1/2015 | Stempora | G06Q 40/08 705/4 |
| 2015/0025917 A1* | 1/2015 | Stempora | G02B 27/0093 705/4 |
| 2015/0035643 A1* | 2/2015 | Kursun | G07C 9/32 340/5.82 |
| 2015/0058159 A1* | 2/2015 | Balram | G06Q 20/3821 705/26.7 |

(56) References Cited

U.S. PATENT DOCUMENTS

| | | | |
|---|---|---|---|
| 2015/0058192 A1* | 2/2015 | Balram | G06Q 40/02 705/35 |
| 2015/0059002 A1* | 2/2015 | Balram | G06F 3/011 726/28 |
| 2015/0073907 A1* | 3/2015 | Purves | G06Q 20/384 705/14.58 |
| 2015/0088546 A1* | 3/2015 | Balram | G16H 10/60 705/3 |
| 2015/0088751 A1 | 3/2015 | Grigg et al. | |
| 2015/0100489 A1* | 4/2015 | Graef | G06Q 20/1085 705/43 |
| 2015/0142595 A1* | 5/2015 | Acuna-Rohter | G06Q 20/40 705/21 |
| 2015/0188913 A1* | 7/2015 | Teixeron | H04L 63/0838 713/155 |
| 2015/0190094 A1* | 7/2015 | Lee | A61B 5/6898 600/479 |
| 2015/0220927 A1* | 8/2015 | Smith | G06Q 40/08 705/44 |
| 2015/0242608 A1* | 8/2015 | Kim | G06F 13/102 726/19 |
| 2015/0269577 A1* | 9/2015 | Avegliano | G06Q 20/4016 705/44 |
| 2015/0310196 A1* | 10/2015 | Turgeman | H04W 12/06 726/19 |
| 2015/0310444 A1* | 10/2015 | Chen | G06Q 20/308 705/44 |
| 2015/0326570 A1* | 11/2015 | Publicover | G06V 40/197 382/117 |
| 2015/0350174 A1* | 12/2015 | Reno | H04L 63/1433 726/25 |
| 2015/0358317 A1* | 12/2015 | Deutschmann | H04W 12/065 713/186 |
| 2015/0373020 A1* | 12/2015 | Hale | G06Q 10/06375 713/170 |
| 2016/0007935 A1 | 1/2016 | Hernandez et al. | |
| 2016/0012403 A1* | 1/2016 | Kursun | G06Q 20/40 705/44 |
| 2016/0014121 A1 | 1/2016 | Perna et al. | |
| 2016/0021081 A1 | 1/2016 | Caceres et al. | |
| 2016/0021535 A1* | 1/2016 | Tali | H04W 12/06 455/411 |
| 2016/0048816 A1 | 2/2016 | Friedman | |
| 2016/0063235 A1* | 3/2016 | Tussy | G06V 40/67 726/6 |
| 2016/0063503 A1* | 3/2016 | Kobres | G06Q 20/40 705/18 |
| 2016/0072800 A1* | 3/2016 | Soon-Shiong | H04L 63/0861 726/7 |
| 2016/0078444 A1* | 3/2016 | Tomasofsky | G06F 21/34 705/44 |
| 2016/0162900 A1 | 6/2016 | Dutt et al. | |
| 2016/0180078 A1* | 6/2016 | Chhabra | G06F 21/57 726/19 |
| 2016/0197918 A1* | 7/2016 | Turgeman | G06F 21/316 726/4 |
| 2016/0226866 A1* | 8/2016 | Chan | G06N 20/00 |
| 2016/0253486 A1* | 9/2016 | Sarkar | G06F 21/316 726/7 |
| 2016/0253490 A1* | 9/2016 | Hong | G06F 21/32 726/7 |
| 2016/0267732 A1* | 9/2016 | Agrafioti | A61B 5/318 |
| 2016/0275508 A1 | 9/2016 | Buchholtz et al. | |
| 2016/0314468 A1 | 10/2016 | Smith et al. | |
| 2016/0321670 A1 | 11/2016 | Avegliano et al. | |
| 2016/0371476 A1* | 12/2016 | Turgeman | G06F 3/04842 |
| 2017/0017781 A1* | 1/2017 | Turgeman | H04L 63/08 |
| 2017/0039568 A1 | 2/2017 | Tunnell et al. | |
| 2017/0061423 A1* | 3/2017 | Bryant | G06Q 20/3226 |
| 2017/0061424 A1* | 3/2017 | Dent | G06Q 20/3224 |
| 2017/0061438 A1* | 3/2017 | Patel | G06Q 20/326 |
| 2017/0070527 A1* | 3/2017 | Bailey | H04L 43/12 |
| 2017/0093846 A1* | 3/2017 | Lopez Lecube | H04W 12/068 |
| 2017/0127230 A1* | 5/2017 | Enriquez | H04L 67/12 |
| 2017/0132635 A1* | 5/2017 | Caldera | G06Q 20/381 |
| 2017/0132636 A1* | 5/2017 | Caldera | G06Q 20/4016 |
| 2017/0161747 A1 | 6/2017 | Einhorn et al. | |
| 2017/0230402 A1* | 8/2017 | Greenspan | H04W 12/08 |
| 2017/0251366 A1 | 8/2017 | Perna et al. | |
| 2017/0344990 A1 | 11/2017 | Kohli | |
| 2017/0364917 A1* | 12/2017 | Karantzis | G06Q 20/384 |
| 2017/0372056 A1* | 12/2017 | Narasimhan | G06F 21/32 |
| 2018/0039990 A1* | 2/2018 | Lindemann | G06V 40/19 |
| 2018/0041503 A1* | 2/2018 | Lindemann | H04L 63/061 |
| 2018/0063149 A1 | 3/2018 | Nagaratnam et al. | |
| 2018/0068108 A1* | 3/2018 | Fish | G06F 21/316 |
| 2018/0089519 A1 | 3/2018 | Raziel et al. | |
| 2018/0089688 A1* | 3/2018 | Kohli | G06Q 20/4016 |
| 2018/0107813 A1* | 4/2018 | Perotti | G06F 21/32 |
| 2018/0276270 A1* | 9/2018 | Bisbee | G06Q 30/0241 |
| 2019/0087554 A1* | 3/2019 | Fish | H04M 1/724631 |
| 2019/0253404 A1* | 8/2019 | Briceno | H04L 63/205 |
| 2020/0329051 A1* | 10/2020 | Grim | H04L 63/08 |
| 2021/0029112 A1* | 1/2021 | Palle | G06F 21/32 |

OTHER PUBLICATIONS

Allan et al "Towards Fraud Detection Methodologies," IEEE, pp. 1-6, (Year: 2010).*

Mandal et al Automatic Video Surveillance for Theft Detection in ATM Machines: An Enhanced Approach, IEEE, pp. 2821-2826 (Year: 2016).*

Onwudelbelu et al "Real Time SMS-Based Hashing Scheme for Securing Financial Transactions on ATM Systems," 3rd IEEE International Conference on Adaptive Science and Technology (ICAST 2011), pp. 1-6 (Year: 2011).*

Sujith "Sujith" "Crime Detection and Avoidance in ATM: A New Framework," (IJCSIT) International Journal of Computer Science and Information Technologies, vol. 5 (5), pp. 6068-6071 (Year: 2014).*

Ojala et al "Wearable Authentication Device for Transparent Login in Nomadic Applications Environment," 2008 International Conference on Signals, Circuits and Systems, pp. 1-6 (Year: 2008).*

Soares et al "Fingerprint and Iris Biometric Controlled Smart Banking Machine Embedded with GSM Technology for OTP," 2016 International Conference on Automatic Control and Dynamic Optimization Techniques (ICACDOT) International Institute of Information Technology, IEEE, pp. 409-414 (Year: 2016).*

Al Rawahi et al "Detecting Skimming Devices in ATM through Image Processing," IEEE, pp. 1-5 (Year: 2015).*

Hameed et al "SafePass: Authentication under Duress for ATM Transactions," 2013 2nd National Conference on Information Assurance (NCIA), pp. 1-5, (Year: 2013).*

Siddiqui "Biometrics to Control ATM Scams: A Study," 2014 International Conference on Circuit, Power and Computing Technologies (ICCPCT) pp. 1598-1602 (Year: 2014).*

Gautam et al "Biometric System from Heart Sound using Wavelet based feature set," International Conference on Communication and Signal Processing, India, IEEE, pp. 551-555 (Year: 2013).*

And See Oracle the Java Tutorials https://docs.oracle.com/javase/tutorial/networking/nifs/definition.html for details, Dec. 8, 2011, pp. 1-2 (Year: 2011).

Mandal et al "Automatic Video Surveillance for Theft Detection in ATM Machines: An Enhanced Approach," IEEE 2016, pp. 2821-2826 (Year: 2016).

Sujith B "Crime Detection and Avoidance in ATM: A New Framework," (IJCSIT) International Journal of Computer Science and Information Technologies, vol. 5 (5), 2014, pp. 6068-6071 (Year: 2014).

* cited by examiner

SYSTEMS AND METHODS FOR DYNAMIC BIO-BEHAVIORAL AUTHENTICATION

CROSS-REFERENCE TO RELATED APPLICATIONS

This Application is a Continuation of U.S. application Ser. No. 15/468,328, filed on Mar. 24, 2017, entitled "Systems and Methods for Dynamic Bio-Behavioral Authentication," which claims priority to Provisional Application No. 62/419,816 filed on Nov. 9, 2016, entitled "Systems and Methods for Dynamic Bio-Behavior Authentication," both of which are incorporated herein by reference in their entireties.

BACKGROUND

Authentication is the process of determining whether a person is the actual person they are asserting themselves to be. A common type of authentication is based on logon passwords. For example, a customer may access and transact with one or more of the customer's financial institution(s) accounts through a variety of channels. As non-limiting examples, a customer's physical credit card may be used to make purchases at a point of sale and/or a credit card number may be used to make purchases online. In other examples, the customer's account information may be accessed and viewed through a financial institution's website, the customer may manage an account through a phone bank, and so on. Although these options provide increased access and convenience for the customer, each of these channels also provide opportunities for fraudulent access. Additionally, some channels of access may be more prone to fraud, either through vulnerabilities of those channels, or because fraud is more common through such channels. On the user side, an occurrence of fraud (e.g., compromised financial data, monetary loss, identity theft, and so on) as well as the need to provide authentication information (e.g., series of questions that need to be answered when speaking with a representative on the phone) have been blamed for user dissatisfaction. On the network side, the diverse number of channels and the proliferation of fraud have amplified the importance of proper authentication.

SUMMARY

In one embodiment, a system for dynamic bio-behavioral authentication comprises: a network interface; and a processor coupled to the network interface and configured to: begin a transaction to allow a user to access a secure resource; receive, via the network interface, user data from a mobile device, the user data comprising behavior data associated with the user; compare one or more parameters of the behavior data to expected parameters; and if the parameters are within a required range, allow access to the secure resource; or if the parameters are outside of the required range, restrict access to the secure resource.

In another embodiment, the transaction comprises a plurality of levels, and wherein the processor is configured to perform a new comparison of one or more parameters of the behavior data to expected parameters prior to granting access to each level of the transaction.

In yet another embodiment, the system comprises an Automated Teller Machine.

In yet another embodiment, the mobile device comprises one or more of: a smartphone, a tablet, a laptop, or a wearable device.

In yet another embodiment, the user data further comprises fingerprint data.

In yet another embodiment, the behavior data comprises data associated with one or more of the user's: recent location, movements, recent emails, recent messages, recent calls, contact lists, playlists, recently played songs, level of activity, heartrate, or blood pressure.

In yet another embodiment, the processor is configured to apply a weight to one or more parameters of the behavior data.

Another embodiment further comprises a database of behavior data associated with a plurality of users.

Another embodiment further comprises a sensor configured to monitor the user during the transaction, and wherein the comparison is based in part on data received from the sensor.

In yet another embodiment, the sensor comprises a camera.

In yet another embodiment, the processor is further configured to request additional user data if the parameters are outside of the required range.

In another embodiment, a method for dynamic bio-behavioral authentication comprises: beginning a transaction to allow a user to access a secure resource; receiving user data from a mobile device, the user data comprising behavior data associated with the user; comparing one or more parameters of the behavior data to expected parameters; and if the parameters are within a required range, allowing access to the secure resource; or if the parameters are outside of the required range, restricting access to the secure resource.

In another embodiment, the transaction comprises a plurality of levels, and wherein the processor is configured to perform a new comparison of one or more parameters of the behavior data to expected parameters prior to granting access to each level of the transaction.

In yet another embodiment, the user data further comprises fingerprint data.

In yet another embodiment, the behavior data is embedded in data associated with the fingerprint data.

In yet another embodiment, the behavior data comprises data associated with one or more of the user's: "home" location, recent location, movements, recent emails, recent messages, recent calls, contact lists, playlists, recently played songs, level of activity, heartrate, or blood pressure.

Yet another embodiment further comprises receiving data from a sensor configured to monitor the user during the transaction, and wherein the comparing is based in part on data received from the sensor.

In yet another embodiment, a computer readable medium may comprises program code, which when executed by a processor is configured to enable dynamic bio-behavioral authentication. This program code may comprise program code configured, when executed by a processor, to: begin a transaction to allow a user to access a secure resource; receive user data from a mobile device, the user data comprising behavior data associated with the user; compare one or more parameters of the behavior data to expected parameters; and if the parameters are within a required range, allow access to the secure resource; or if the parameters are outside of the required range, restrict access to the secure resource.

In another embodiment, the behavior data comprises data associated with one or more of the user's: recent location, movements, recent emails, recent messages, recent calls, contact lists, playlists, recently played songs, level of activity, heartrate, or blood pressure.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE FIGURES

A full and enabling disclosure is set forth more particularly in the remainder of the specification. The specification makes reference to the following appended figures.

DETAILED DESCRIPTION

Figure 1:
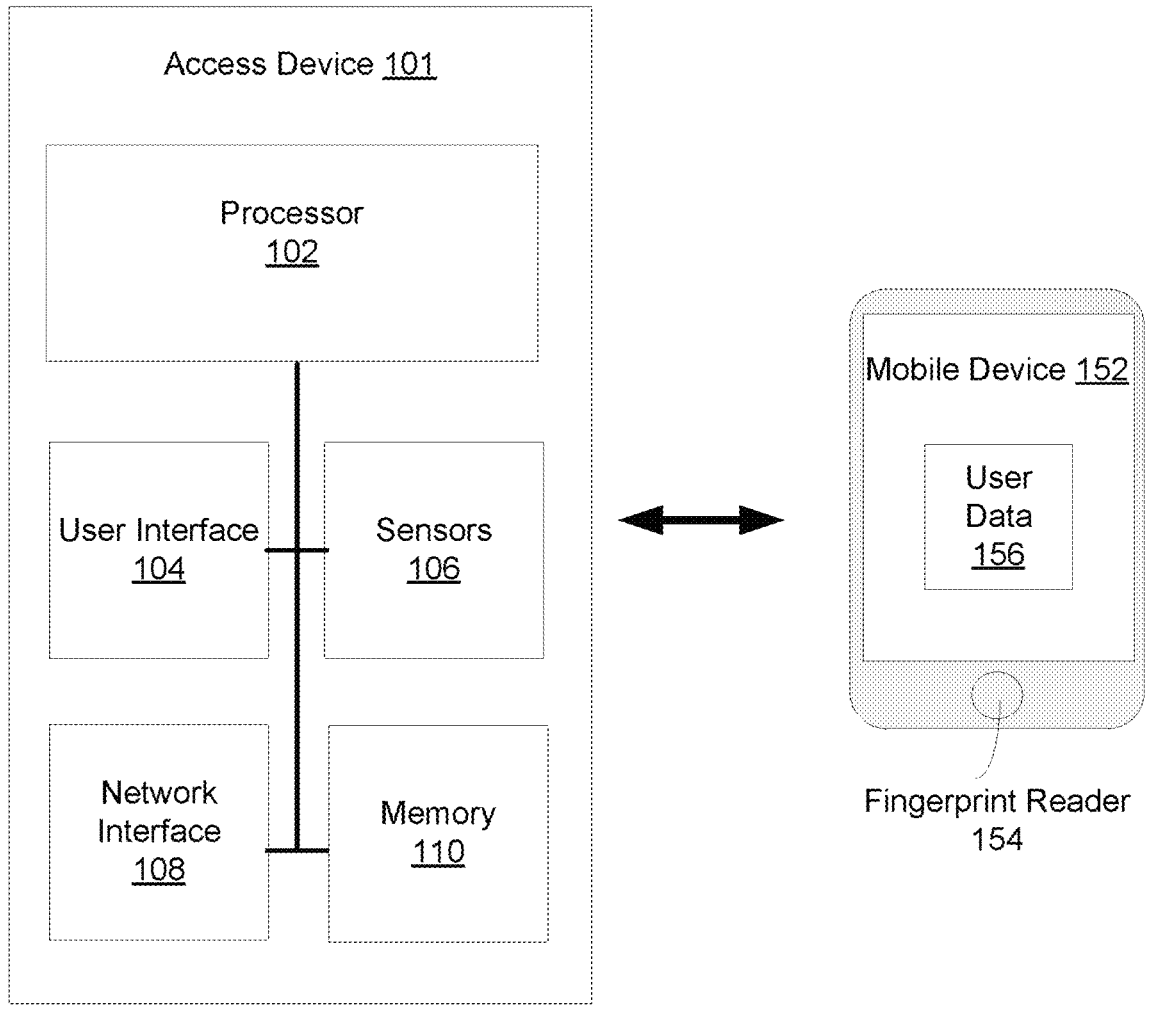
FIG. 1 shows an illustrative system for dynamic bio-behavioral authentication according to one embodiment of the present disclosure.

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations as come within the scope of the appended claims and their equivalents.

Illustrative Example of a Dynamic Bio Behavioral Authentication

One illustrative embodiment of the present disclosure comprises an access device, which a user uses to access a secure resource. For example, the access device may comprise an Automated Teller Machine ("ATM") the user uses to access funds or account information. In the illustrative embodiment, the access device is configured to allow the user to access the secure resource only after the user complies with a security protocol. In the illustrative embodiment, this security protocol comprises a comparison of information associated with the user to a database of stored information about the user.

In the illustrative embodiment, the user may approach the access device (e.g., an ATM) and enter basic account information (e.g., an account number, pin number, etc.). However, before allowing access to a secure resource (e.g., money or restricted account information), the access device requests additional information to confirm the user's identity. This information comprises information tracked by a behavioral device, such as a mobile device (e.g., a smartphone, tablet, or laptop), wearable device, vehicle, fitness monitor, activity monitor, or some other device comprising one or more sensors capable of monitoring the user. Non-limiting examples of information that may be tracked include the user's: location information (e.g., recent locations or movements), travel portfolio data, communication information (e.g., recent emails, recent messages, recent calls, or contact lists, activity information (e.g., games, applications, playlists, recently played songs), health information (e.g., quality of sleep, level of activity, heartrate, or blood pressure), or some other information that may be tracked by a behavioral device.

The access device receives this information from the behavioral device via a wireless network (e.g., cellular, wi-fi, or bluetooth). The access device then compares the data to a database of data associated with the user to determine whether there is a variance between the current data and past data. For example, the access device may compare parameters of the recorded data to historical data to confirm that it has identified the correct user (e.g., the access device may confirm that the user's recent locations match past locations and that the user's recent activities also match expectations).

Further, in some embodiments, the access device compares currently measured data against certain risk factors not associated with the user's past information. For example, the access device may analyze factors associated with a risk that a robbery is taking place. In some embodiments, the access device may analyze movement data, biometric data, or some other type of data that may be associated with a robbery. For example, in one embodiment, the access device may analyze whether the user's heartrate is elevated or whether the user is alone or if another person standing behind the user. In still another embodiment, the access device may analyze its location and the current time of day (e.g., late at night in a bad neighborhood) and determine that there is a higher likelihood that a robbery is taking place. In some embodiments, the access device may analyze a plurality of factors to make this determination (e.g., time, location, the user's elevated heartrate, and that someone is standing behind the user).

In some embodiments, as part of the comparison, the access device may weight certain parameters. For example, the access device may place a higher weight on health information, such as blood pressure or heartrate, and a lower weight on communication, e.g., recent calls. Further, in some embodiments, the access device may comprise its own sensors, e.g., cameras or motion sensors, and restrict access to the secure resource based on data received from these sensors, e.g., compare the image to an expected image, or restrict access if more than one person is visible. Further, in some embodiments, each level of access may require additional verification. For example, a first layer of verification may be required to access account balance information, and a higher level of verification may be required to withdraw or transfer funds. Further, in such an embodiment, a higher level of verification may be required to withdraw a larger amount of funds. In some embodiments, the access device may deny the transaction, limit the transaction, alert a company representative (e.g., a representative of the financial institution), and/or alert the authorities of the likelihood that a robbery is taking place.

The illustrative embodiment of the present disclosure may further require additional information, such as a thumbprint, retinal scan, or voice scan to be received from the user's mobile device prior to granting access to the secure information. For example, the user may be required to scan his or her thumbprint or retina via a scanner or provide a voice scan or voice print for identifying the user, e.g., with voice recognition software on the mobile device. This data may then be transmitted to the access device for comparison. Further, in some embodiments, the user data discussed above, may be embedded in the thumbprint or voiceprint data for transmission to the access device. Thus, the security protocol may have an even higher level of security requiring both an accurate thumbprint and data that matches past data about the user.

One illustrative embodiment of the present disclosure comprises a profile of the user's information. This profile may be used to confirm the user's identity, for example, by comparing the user's past behavior to current information associated with the user's behavior. In some embodiments, the profile may be continually updated. In some embodiments, the user's profile may allow for various levels of authentication, e.g., a 1 equates to a low level of authentication and a 9 equates to a high level of authentication.

In some embodiments, systems associated with the user may monitor various information to create a profile of the user's information. In some embodiments, the profile may comprise a combination of user attributes as well as biometrics associated with the user. This information may be combined to create a unique security profile associated with the user. In some embodiments, this security profile may be further encrypted with a dynamic formula. In some embodiments, this dynamic formula may include, or be based on, the user's behaviors.

In some embodiments, one or more sensors may be configured to monitor a plurality of information about the user. Non-limiting examples of data that may be monitored or measured include: users' home address (e.g., GPS location of where user spends the most time), users' work address (e.g., GPS location of where user commutes to from users' home address on a "frequent" basis), users' most common routes over a period of time (e.g., the last 6 months), a user's travel portfolio data (e.g., data monitored by a navigation system in a vehicle), data associated with a user's ride-sharing profile, number of steps taken or average number of steps taken (e.g., the number of steps taken daily over a certain period, e.g., for the last 30 days), list of musical artists or songs loaded on the user's device, fingerprint or thumbprint information, image(s) of the user's eye, telephone number, user's chat contact information or information associated with the user's chats, users contact list of names, user's voice print (e.g., of a predetermined phrase or word), or the user's captured images.

In some embodiments, an algorithm may compare the information discussed above, and/or other information, and determine an accuracy figure associated with the likelihood that the user is the correct user. For example, this value may be from 0-9, where 0 means little to no match and 9 means a high likelihood that the user is recognized. The user's access to secure information or resources may be restricted based on this value. In some embodiments, this information may be continually updated, e.g., at a set interval (e.g., every second or after a certain number of milliseconds).

As discussed above, in some embodiments, the user's information may be encrypted. In some embodiments, this encryption may be based on a randomly generated key. In one embodiment, the randomly generated key may be based upon the user's phone number. For example, in one embodiment, the key may be determined from the user's phone number, e.g., the fifth digit from the end of the number working right to left. In such an embodiment, if the user's phone number is 153426667, then the key will be 2. In such an embodiment, this number represents used with the random seed generator. For example, in one embodiment, anytime a random number is needed this number is fed into a random number generator (or pseudo-random number generator). Further, in some embodiments, the random number may include additional information, e.g., information associated with when it was generated, e.g., a unique number with additional data identifying the time down to the date, time, hour, minute, second, millisecond (e.g., a four digit year, two digit month, two digit day, and then a four digit representation of the milliseconds). In still other embodiments, the seed may be generated based in part on data collected about the user by a behavioral device (e.g., a mobile device). For example, in one embodiment, the seed is generated based in part on data such as the user's location history, web browsing history, recent songs played, videos watched, and/or some other data monitored by a behavioral device.

Further, in some embodiments, this number represents how often a data stream may be interrupted with unrelated data (sometimes referred to as a "fill"). In some embodiments, additional fill is inserted after a certain number of characters in the data. In some embodiments, this number of characters may correspond to the number selected above, e.g., the fifth digit from the end of the number working right to left. In such an embodiment, if the user's phone number is 153426667, then the key will be 2. In such an embodiment, additional "fill" is inserted every two characters. For example, rather than storing the word "mike" the system may instead store "m!i #k % e" or similarly interrupted data. Alternatively, if the selected key is 5, then "mike" may be stored as "mike!" or "mike&."

In the embodiment described above, the key cannot be higher than 9, because this is the highest single digit. Further, a lower number may be selected, e.g., a number less than 6, to allow for sufficient fill in the stored data. Further, in some embodiments, if the user's phone number changes, the system may go through a transition time, where a new time-date stamp is created and a new c-generator is created. In some embodiments, software of the present disclosure may prompt the user for the old phone number than convert the encryption to data based on the new phone number.

In one embodiment, when the application is initially started (e.g., an application running on a user's mobile device), it may request that the user allow it to access stored information associated with the user, e.g., information associated with one or more of the sensors discussed herein. For example, in some embodiments, the system may prompt the user to say a semi-random word (e.g., a word taken from a list of potential words) a certain number of times (e.g., three times). In some embodiments, a voiceprint associated with the spoken word may be stored using the encryption methodology discussed above. In some embodiments, this information may be stored locally, and not transmitted to any remote location. Further, over a certain period information about the user may be gathered from the sensors. This period may comprise various times, e.g., I week, 30-days, 90-days, or some other time period.

After a certain period the user may be notified of the recorded information, and provide a sample of this recorded information for the user to confirm (e.g., a home address, commonly played songs, etc.). This information may be provided to the user at various intervals, (e.g., every week, 30-days, 90-days, or some other time period), along with providing the user the opportunity to confirm any of the information.

In some embodiments, the decryption methodology, needed to decrypt the data, is not stored locally on the device. Rather, this data is stored remotely (e.g., on a server), and may be transmitted to the device. Thus, in some embodiments, the decryption methodology is stored remotely, and the data is stored locally. Further in some embodiments, the data is stored only locally, and is not available to a user of the remote server. Further, in such an embodiment, if a person breaks into the local device, that person cannot access the data because the decryption method resides only on a server, which may be behind a firewall.

Further, in some embodiments, other applications on the mobile device may access the software discussed above for authentication. This access may be similar to a call for a level of confirmation associated with the user, as discussed above. Thus, for example, an application associated with a shopping website may access the software discussed above prior to allowing a user to confirm a transaction.

Example Embodiments of Dynamic Bio-Behavioral Authentication

FIG. 1 shows an illustrative system 100 for dynamic bio-behavioral authentication according to one embodiment of the present disclosure. The system 100 comprises an access device 101 and a mobile device 152. Access device 101 comprises a device to provide access to a secure resource. In some embodiments, access device 101 may comprise, e.g., an ATM, a kiosk, a desktop computer, or a server computer. Mobile device 152 comprises one or more of a smartphone, tablet, wearable device, media player, or laptop computer.

As shown in FIG. 1, the access device 152 comprises a processor 102 interfaced via a bus with a user interface 104, sensors 106, network interface 108, and memory 110.

Processor 102 may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices, configured to access program code and other data stored on memory 110 or available via network device 108. Processor 102 is further configured to execute an application to provide access to a secure resource. In some embodiments, access is restricted based on a comparison of user data to stored data as described in further detail herein.

User interface 104 may comprise one or more interfaces used to facilitate user interaction with electronic devices such as one or more displays, touchscreens, touchpads, keyboards, mice, speakers, microphones, cameras (e.g., a front and/or a rear facing camera on a mobile device) and/or other hardware used to input data or output data.

Sensors 106 may comprise one or more sensors configured to detect data associated with a user during a transaction, e.g., optical detectors, laser detectors, temperature sensors, or sensors configured to detect information associated with the user.

Network device 108 represents one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network).

Memory 110 comprises any suitable tangible (and non-transitory) computer-readable medium such as RAM, ROM, EEPROM, or the like, and embodies program components that configure operation of the access device.

As shown in FIG. 1, the mobile device 152 comprises a mobile device as known in the art. As shown in FIG. 1, the mobile device 152 comprises a fingerprint reader 154, which may comprise an optical or capacitive fingerprint reader as known in the art. The mobile device 152 further comprises a processor, memory, and sensors configured to monitor data associated with the user. Non-limiting examples of information that the mobile device 152 may track include the user's: location information (e.g., recent locations or movements), communication information (e.g., recent emails, recent messages, recent calls, or contact lists, activity information (e.g., games, applications, playlists, recently played songs), health information (e.g., level of activity, heartrate, or blood pressure), or some other information that may be tracked by a mobile device 512.

In some embodiments, fingerprint reader 154 may comprise one or more systems for capturing data associated with a user's fingerprint. For example, fingerprint reader 154 may comprise a system for optical scanning or capacitance scanning. Most fingerprint scanner systems compare specific features of the fingerprint, generally known as minutiae. Typically, human and computer investigators concentrate on points where ridge lines end or where one ridge splits into two (bifurcations). Collectively, these and other distinctive features are sometimes called typica. Software associated with fingerprint reader 154 may use highly complex algorithms to recognize and analyze these minutiae. The basic idea is to measure the relative positions of minutiae. In some embodiments, to get a match, the fingerprint reader 154 does not have to find the entire pattern of minutiae both in the sample and in the print on record, it simply has to find a sufficient number of minutiae patterns that the two prints have in common. In some embodiments, the exact number varies according to the scanner programming.

As shown in FIG. 1, the mobile device 152 further comprises user data 156. User data may be stored in a memory of the mobile device 152, which may comprise any suitable tangible (and non-transitory) computer-readable medium such as RAM, ROM, EEPROM, or the like. The user data 156 comprises data associated with the user, e.g., user behavior data, such as, location information, communication information, health information, or some other information that may be tracked by a mobile device 512.

The mobile device 152 further comprises a network interface to transmit data, e.g., fingerprint data and/or other data associated with the user, to the access device 101. Examples include, but are not limited to, wired interfaces such as Ethernet, USB, IEEE 1394, and/or wireless interfaces such as IEEE 802.11 Bluetooth, or radio interfaces for accessing cellular telephone networks (e.g., transceiver/antenna for accessing a CDMA, GSM, UMTS, or other mobile communications network).

Figure 2:
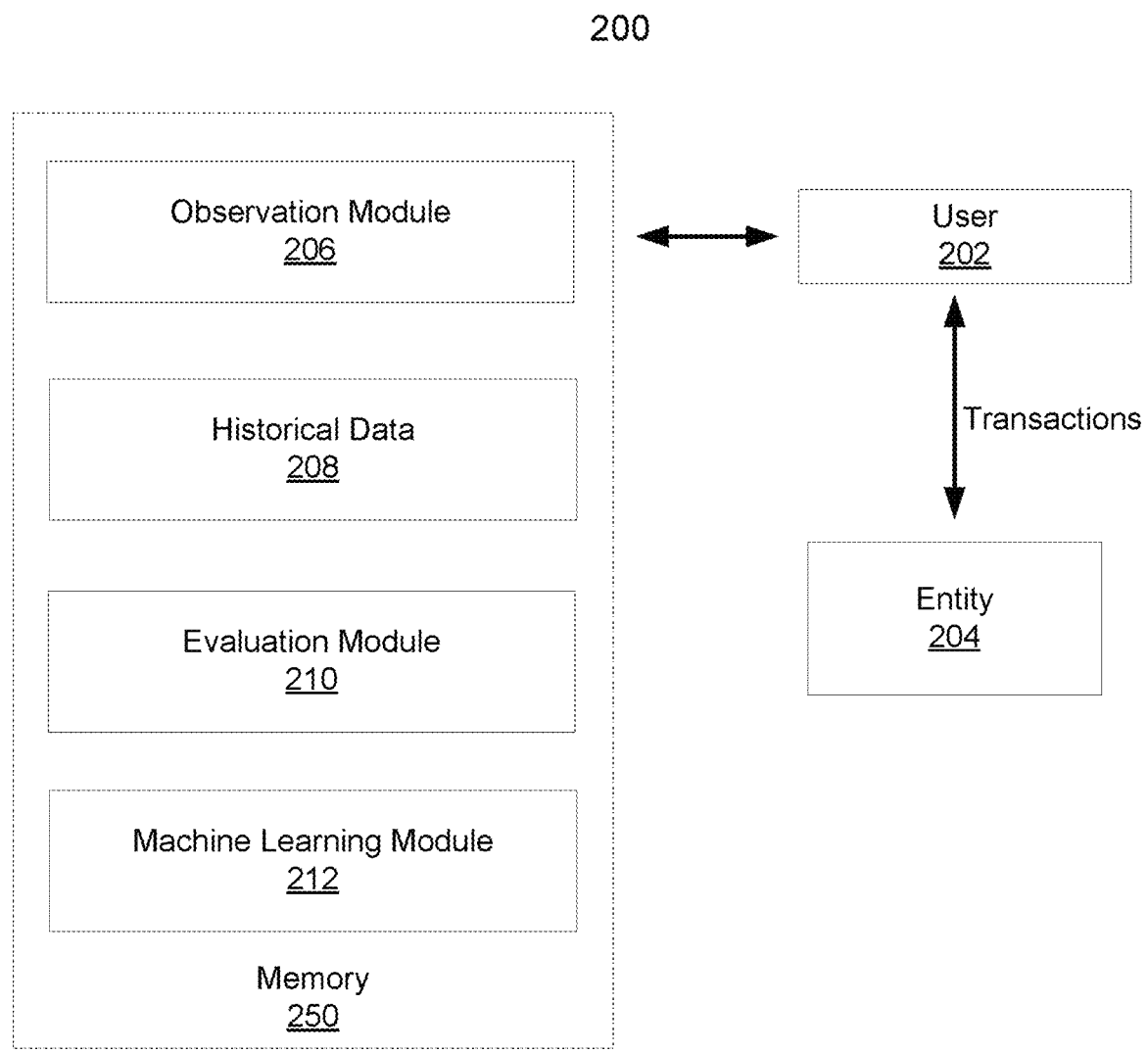
FIG. 2 shows another illustrative system for dynamic bio-behavioral authentication according to one embodiment of the present disclosure.

Turning now to FIG. 2, which shows another illustrative system 200 for dynamic bio-behavioral authentication according to one embodiment of the present disclosure. The system 200 shows a user 202 interacting with an entity 204. The user 202 may comprise an account holder. The entity 204 may comprise one or more entities that control access to secure information and resources, e.g., banks, insurance companies, credit unions, or other entities. The transactions may occur in a similar way as the transactions described above with regard to FIG. 1, e.g., a user attempting access secure information or resources via a access device.

Memory 250 comprises any suitable tangible (and non-transitory) computer-readable medium such as RAM, ROM, EEPROM, or the like. The memory 250 may comprise memory on one or more of either an access device (e.g., access device 101 described above), a mobile device (e.g., mobile device 152 described above), or a remote data source (e.g., a server computer). As shown in FIG. 2, the memory 250 comprises a plurality of software modules 206-222, each of which may be embodied in program code.

The observation module 206 is configured to capture the information related to a user 202's activity. In some embodiments, during a monitoring period (e.g., over a span of a few days, a week, two weeks, a month, and so on), the observation module 206 may be configured to monitor one or more attributes associated with at least one user 202. For example, in one embodiment, a mobile device or wearable device associated with the user 202 may be configured to monitor geospatial attributes, biological attributes, behavioral attributes, health attributes, device attributes, and other types of attributes. Further, in some embodiments, an access device may monitor user behavior in each transaction. For example, historical user behavior during transactions may be compared to another transaction (such as a high value transaction), or multiple other transactions. In another example, user 202 and/or device movement may be tracked and compared with historical movements. The comparison may indicate where the user and/or the device was at during a previous time to where the user 202 and/or device is at currently.

In some embodiments, the monitoring may be performed by a mobile device. Alternatively, in some embodiments, the monitoring may be performed by a secondary device alone or along with the mobile device. Example secondary devices include, but are not limited to, wearable devices (e.g., a health monitoring device, an activity monitoring device, a wristwatch, jewelry, tracking devices, or other objects that includes communication capabilities, and so on), implanted or skin-attachable devices (e.g., a pacemaker, microchip, smart tattoo, cardioverter-defibrillator, and so forth). Additionally or alternatively, monitoring may be performed by one or more external devices such as communication devices (both wired and wireless), a vehicle, an object with an RFID chip or other communication mechanism, etc. According to some implementations, these devices may take measurements of the user 202's electrodermal system, cardiovascular system, musculoskeletal system, nervous system, ocular system, eccrine system, lips, facial expressions, pupillary dilation, brainwaves, breathing rate, vocal characteristics, blood pressure, heartrate, and heartrate variability.

In some embodiments, the observation module 206 may determine if a device (e.g., phone, vehicle, etc.) associated with the user is near the user at the time of the transaction. In some embodiments, monitoring may also include the device or a set of devices taking a random sample of the user's voice (e.g., voiceprint) to verify the user is present when the interaction is initiated or at some point during the interaction. In still other embodiments, facial recognition may be utilized. In still other embodiments, observation module 206 may be configured to determine a known vehicle (or typical vehicle) is present and/or connected to a device (through a wired or wireless communications media) when the interaction with the entity 204 is initiated. In another example, the observation module 206 may be configured to check with a carrier to make sure the user still owns the phone (and has not reported it stolen).

Further, in some embodiments, when a user 202 attempts to initiate a transaction with the entity 204, the observation module 206 may obtain one or more current attributes of the user. These current attributes may be obtained directly by observation module 204 and/or through one more of the external devices as described above.

Historical data 208 comprises stored data associated with the user 202 as measured by observation module 206. In some embodiments, historical data 208 may be stored in a remote data store, e.g., a remote server accessible via a network connection. For example, historical data 208 may comprise the user's home address. In some embodiments, this may be determined from the GPS data and comprise the most common location of a mobile device from the hours of 9:00 PM-7:00 AM. In other embodiments, the historical data may comprise data associated with the user's movements, e.g., data associated with the routes the user most often travels and the time of day during which the user travels those routes or the user's travel portfolio data (e.g., data determined from a GPS in the user's vehicle, e.g., the vehicle's navigation system).

Evaluation Module 210 is configured to compare data collected by observation module 206 with expected data values. For example, evaluation module 210 may compare data collected by observation module 206 with historical data 208. In some embodiments, evaluation module 210 may compare collected data or parameters and attributes of that collected data to expected values. Further, evaluation module 210 may be configured to determine if user 202 should be authenticated or should not be authenticated (e.g., authentication status). In some embodiments, the authentication determination may be based on weighted values that are applied based on the type of interaction the user is attempting to conduct with the entity 204, parameters associated with the interaction, and/or parameters associated with the user 202.

In one embodiment, for example, a typical heartrate of a user may be between 72 and 75 beats per minute. The evaluation module 210 may compare the heartrate currently being monitored with the typical (for this user) heartrate for certain types of interaction. If the currently monitored heartrate falls between 72 and 75 beats per minute, according to this example, there is a match. However, if the currently monitored heartrate is below 72 beats per minute, or above 75 beats per minute, there is no match and additional authentication measures may be taken.

In some other embodiments, the evaluation module 210 may further compare other information to determine if there is a risk of a fraudulent transaction or a robbery. For example, the evaluation module 210 may be configured to determine if the user's behavior is erratic, e.g., very high blood pressure or heart-rate, engaging in a transaction at a very uncommon hour, or at an uncommon location (e.g., in an area to which the user has never traveled). Based on this information the evaluation module 210 may determine that a robbery or fraudulent transaction may be taking place and restrict access or lower the current level of access. Further, in some embodiments, the evaluation module 210 may alert company personnel or the authorities.

In some embodiments, the evaluation module 210 may be configured to compare multiple attributes of the user 202. Further in some embodiments, the evaluation module 210 may apply a weight to each of the attributes. Different combinations of attributes and weights may facilitate a more complete and accurate determination related to identification of the user.

By tracking and comparing data associated with the user 202 the evaluation module 210 may be configured to determine a variance between expected data and actual data. If this variance is within a tolerable range, the evaluation module 210 may allow access to a secure resource (e.g., data or funds). Further, in some embodiments, the evaluation module may limit access to a reduced level based on the variance. For example, a variance of 30% may be acceptable for a small withdrawal, but not acceptable for a large withdrawal or transfer. Further, if the variance is outside of an acceptable level, the evaluation module may request additional information associated with user 202 from the observation module 206.

Further, in some embodiments, evaluation module 210 may be configured to reduce the weight of certain attributes based on recent recorded information. For example, a user may be injured, which causes the user's stride to change or the total number of steps to be reduced. In such an embodiment, evaluation module 210 may reduce the weight of these factors in the authentication. Further, in such an embodiment, the evaluation module 210 may increase the weight of the non-physical factors. Similarly, in some embodiments the user's voice may have recently changed, e.g., due to sickness. In such an embodiment, the evaluation module may reduce the weighting associated with voice and/or activity and correspondingly increase the weight of other factors.

Further, in some embodiments, different security levels may be required based on the transaction type. For example, in some embodiments, the type of interaction may be through an online website, over the telephone, in person at a banking institution, in person at an ATM, etc. Each of these types of transactions may comprise different required authentication levels.

Machine Learning Module 214 comprises a component that employs automated learning and reasoning procedures (e.g., the use of explicitly and/or implicitly trained statistical classifiers) in connection with determining whether a user may be automatically authenticated or whether additional action is necessary to continue the authentication process in accordance with one or more aspects described herein. Additionally or alternatively, the machine learning module 214 may rely on predictive models constructed using machine learning and/or automated learning procedures. Logic-centric inference may also be employed separately or in conjunction with probabilistic methods.

In some embodiments, the machine learning module 214 may infer a potential for fraudulent activity or potential fraud, for example, by obtaining knowledge about various logged information, such as historical data 208, which may include error logs and/or the level of errors. For example, if the current trend for fraud is higher for a particular interaction type, the machine learning module 214 may automatically require the user to take additional action to complete the authentication. In another example, based on a confidence level that the user is in fact the authorized user, the machine learning module 214 may automatically authenticate the user and continue to authenticate the user during the entire interaction (or at least a portion of the interaction).

If the machine learning module 214 has uncertainty related to the authentication of the user 202, it may automatically engage in a short (or long) dialogue or interaction with the user 202, e.g., answer a security question, enter a temporary code, etc. In accordance with some embodiments of the present disclosure, the machine learning module 214 engages in the dialogue with the user through another system component and/or an external device.

Illustrative Method for Dynamic Bio-Behavioral Authentication

Figure 3:
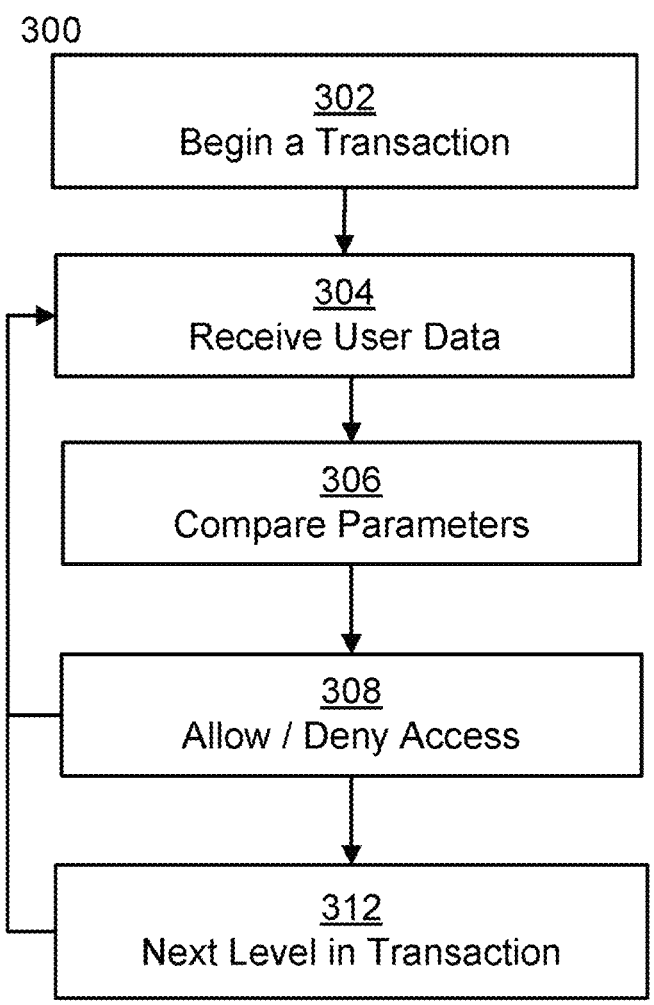
FIG. 3 is a flow chart of method steps for dynamic bio-behavioral authentication according to one embodiment of the present disclosure.

FIG. 3 is a flow chart of steps for performing a method for dynamic bio-behavioral authentication according to one embodiment. In some embodiments, the steps in FIG. 3 may be implemented in program code that is executed by a processor, for example, the processor in a general purpose computer, a mobile device, or a server. In some embodiments, these steps may be implemented by a group of processors. In some embodiments one or more steps shown in FIG. 3 may be omitted or performed in a different order. Similarly, in some embodiments, additional steps not shown in FIG. 3 may also be performed. The steps below are described with reference to components described above with regard to system 100 shown in FIG. 1.

The method 300 begins at step 302 when the processor 102 begins a transaction. The transaction comprises a transaction between a user and an access device 101. The access device may comprise, e.g., an ATM, a kiosk, a desktop computer, or a server computer. For example, in one embodiment, the user may engage in an online transaction via the user's home computer. Alternatively, in another embodiment, the user may engage in a telephone transaction via a telephone call to a representative of an entity (e.g., a bank, insurance company, healthcare company, etc.).

Next, at step 304 the processor 102 receives user data. In some embodiments, the user data may be received via a network connection, e.g., network interface 108 described above. Further, in some embodiments, the user data may be encoded or encrypted in other user data. For example, in some embodiments, the user data may be encoded or encrypted in data associated with the user's fingerprint or in data associated with the user's retinal scan. Alternatively in some embodiments the user data may be encoded or encrypted in data associated with a voice scan or voice print associated with the user.

In some embodiments, the user data may be received from, e.g., mobile device 152 and/or a remote device associated with mobile device 152 (e.g., a wearable device or other type of device described above with regard to observation module 206 of FIG. 2). The user data may comprise, e.g., geospatial attributes, biological attributes, health attributes, device attributes, and other types of attributes. Further, in some embodiments, at least some of the user data may be received from one or more sensors 106 of the access device 101. These sensors may be configured to monitor the user's actions and surroundings during the transaction.

Then at step 306 the processor 102 compares the parameters. In some embodiments, the processor 102 compares parameters to historical data 208. In some embodiments, the processor 102 may compare a plurality of data types and may further apply weights to the data. For example, in some embodiments a higher weight may be applied to the user's activity data and a lower weight applied to the user's recent correspondence. Further, in some embodiments the processor 102 may apply a higher weight to data received from sensors 106 of the access device 101. In still other embodiments, the processor 102 may be configured to analyze additional data associated with the access device 101, e.g., its location, the time of day, the current weather. In still other embodiments the processor 102 may further be configured to analyze data associated with the transaction, e.g., the type or amount of the transaction, the number of transactions, the similarity of the transaction to past transactions, etc. In some embodiments, the processor 102 may be configured to weight each of these factors and include them in the analysis of whether to allow or deny access to protected resources.

At step 308 the processor allows or denies access based on the comparison. In some embodiments, the decision to allow or deny access may be based on a variance value determined from the comparison. For example, if the variance is within a threshold the processor 102 may allow the transaction to continue. Alternatively, if the variance is outside of the threshold the processor may request additional user information and perform an additional comparison, or terminate the transaction. Further, in some embodiments, the variance may be sufficient to allow only a certain type of transaction. For example, a variance of 30% may be acceptable for a small withdrawal, but not acceptable for a large withdrawal or transfer.

Further, in some embodiments, the processor 102 may continually monitor parameters in substantially real-time. Thus, as these parameters change the user's level of access may go up or down. For example, if the user's blood pressure and heartrate spike the processor 102 may determine that a robbery is potentially taking place and reduce the user's level of access. Alternatively, if the number of people around the user during the transaction declines, the processor 102 may determine that a robbery is less likely to be taking place, and increase the user's level of access.

At step 310 the processor allows the user to proceed to the next level in the transaction. The next level may allow additional access to protected resources or data. In some embodiments, each level in the transaction, e.g., each step may comprise a different level of security that requires a different level of measured data. For example, in one embodiment, the level of security required for checking current balance is less than the level of authorization required for a withdrawal or transfer. Similarly, in some embodiments, the level of authorization required for large withdrawal or transfer is higher than is required for a smaller withdrawal or transfer. In some embodiments, the processor 102 requests additional user data and performs an additional comparison prior to allowing the user to each further level of a multi-level transaction.

Example Embodiments of Dynamic Bio-Behavioral Authentication

Figure 4:
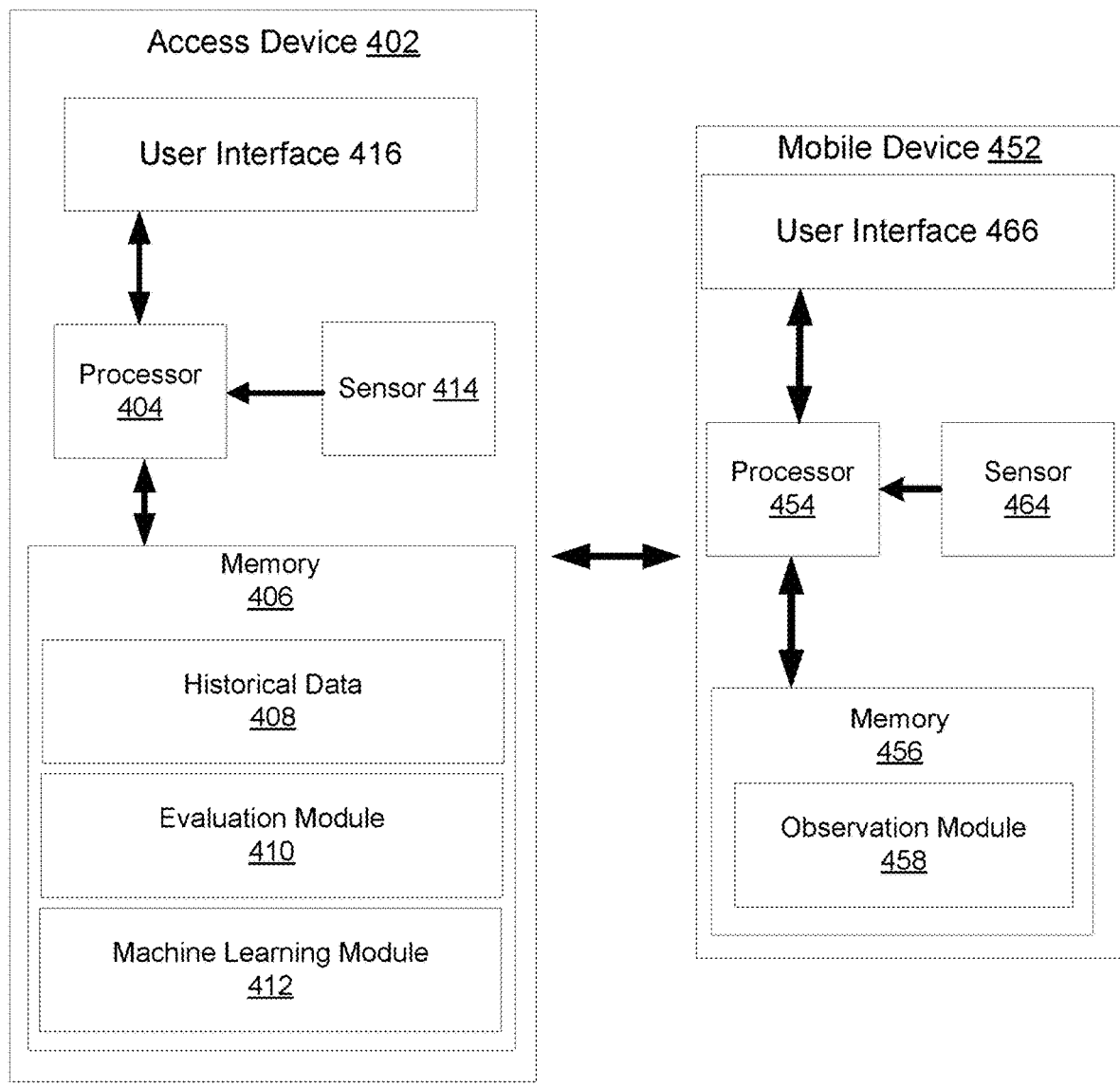
FIG. 4 shows an example system for dynamic bio-behavioral authentication according to one embodiment of the present disclosure.

FIG. 4 shows an example system 400 for dynamic bio-behavioral authentication according to one embodiment of the present disclosure. As shown in FIG. 4, the system 400 comprises an access device 402 in the form of an ATM, which is in communication with a mobile device 452 in the form of a smartphone.

In the embodiment shown in FIG. 4, the ATM 402 comprises a processor 404, memory 406, sensor 414, and user interface 416, which, respectively, are similar to processor 102, memory 110, sensor 106, and user interface 104 described above with regard to FIG. 1. Memory 406 further comprises historical data 408, evaluation module 410, and learning module 412, which are each, respectively, similar to historical data 208, evaluation module 210, and learning module 212 described above with regard to FIG. 2.

In the embodiment shown in FIG. 4, the smartphone 452 comprises a processor 454, a sensor 464, and memory 456. The processor 454 and memory 456 comprise components similar to processor 102 and memory 110 described above with regard to FIG. 1. Memory 456 comprises observation module 458, which is similar to observation module 206 described above with regard to FIG. 2, and is configured to control sensor 464 to monitor user data and store that data.

Sensor 464 comprises one or more sensors configured to measure any parameter that may be recorded by a mobile device. For example, in some embodiments, sensor 464 may comprise one or more of: a camera, touchscreen, fingerprint sensor, one or more buttons, movement sensors, GPS, AGPS, accelerometers, velocity sensors, speakers, microphones, clocks, heartrate sensors, blood pressure sensors, temperature sensors, web-browser history, web-favorite history, data usage, stored pictures, signal detection systems (e.g., Bluetooth, wi-fi, or cellular antennas), software configured to track usage, e.g., usage of applications, messaging, emailing, calling, gaming, or other applications associated with a mobile device.

Figure 5:
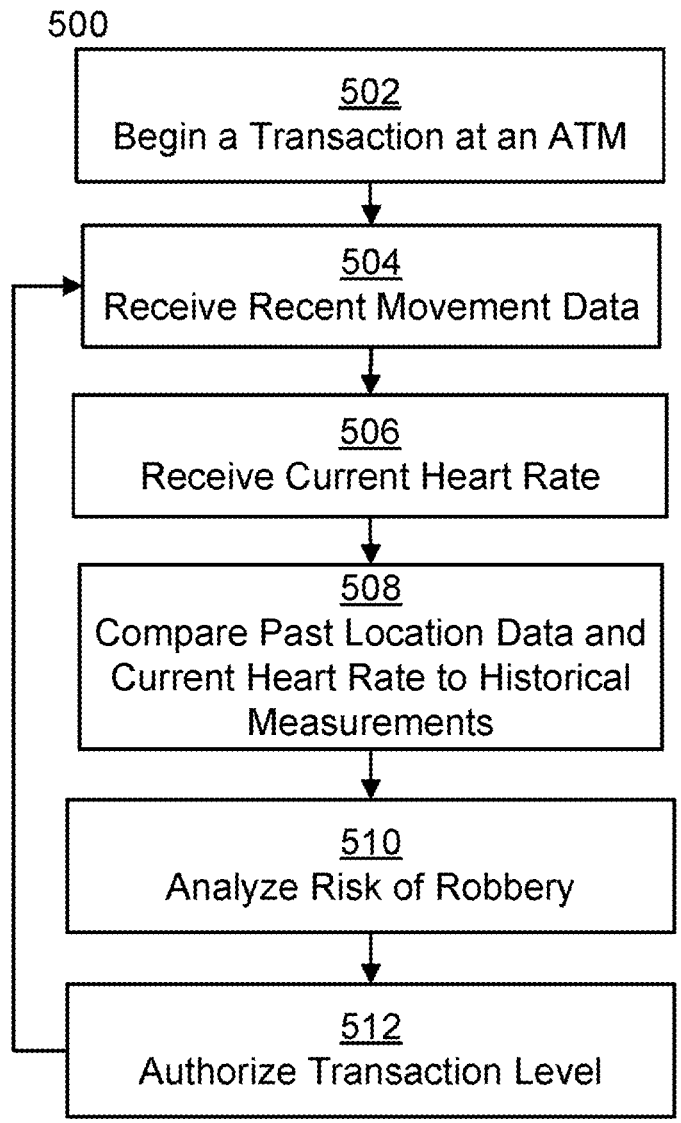
FIG. 5 is an example flow chart of method steps for dynamic bio-behavioral authentication according to one embodiment of the present disclosure.

Turning now to FIG. 5, which is an example flow chart of method steps for dynamic bio-behavioral authentication according to one embodiment of the present disclosure. In some embodiments, the steps in FIG. 5 may be implemented in program code that is executed by a processor, for example, the processor in a general purpose computer, a mobile device, or a server. In some embodiments, these steps may be implemented by a group of processors. In some embodiments one or more steps shown in FIG. 5 may be omitted or performed in a different order. Similarly, in some embodiments, additional steps not shown in FIG. 5 may also be performed. The steps below are described with reference to components described above with regard to system 400 shown in FIG. 4. In the smartphone 452 of FIG. 4, the sensor 456 comprises a heartrate sensor, GPS, and software to monitor message usage.

The method 500 begins at step 502 when the processor 404 begins a transaction. The transaction comprises a transaction between a user of mobile device 452 and access device 402, which, in this embodiment, comprises an ATM. In other embodiments, access device 402 may comprise a kiosk, a desktop computer, or a server computer, or other device.

At step 504, the processor 404 receives movement data from the mobile device 452. The movement data comprises data collected by sensor 464 stored in observation module 458 by processor 404. For example, the movement data may comprise the user's movements over a certain period of time (e.g., 12-hours, 1-day, 1-week). This data is then transmitted to access device 402 via a network connection (e.g., Bluetooth, cellular, or wi-fi connection).

Next, at step 506, the processor 404 receives current heartrate data from the mobile device 502. The heartrate data comprises data determined by sensor 414 of mobile device and transmitted to access device 402 via a network connection.

Then, at step 508, the processor 404 compares the past location data and current heartrate to historical measurements. For example, the processor 404 compares where the user has been over a pre-set period and the user's current heartrate to historical data 408 stored in memory 406. For example, the processor 404 may determine if the user has been staying at his or her home over the recent period, whether the user has travelled outside of a home area, and whether the user has visited any new areas. Any one of these may indicate that the user is not the actual account holder, e.g., that someone has stolen the user's identity or the user's mobile device. Further, the processor 404 compares the user's current heartrate to an expected heartrate, based on earlier measurements. A different heartrate may be an indication that the user is not the account holder. Alternatively, a high heartrate may be an indication that a robbery is taking place.

Next, at step 510, the processor 404 analyzes the risk of robbery. The processor 404 may consider multiple factors, for example, the location of the ATM (e.g., in a high crime area), the time of the transaction (e.g., a very late transaction may be higher risk), the current weather (e.g., worse weather may increase the chance of a robbery), whether there are other people present (e.g., if a person is standing directly behind the user), facial recognition (e.g., if a comparison indicates that the person engaging in the transaction does not look like the user), or some other data point measured by one of sensors 414 or 464.

Then, at step 512, the processor 404 authorizes the transaction level. For example, the processor may determine that comparison in step 508 indicates a high likelihood that the user is the account holder (e.g., the location history and heartrate match the expected values). Further, the analysis at step 510 may indicate a low risk of robbery. In some embodiments, if the comparison at step 508 or analysis at step 510 is within a threshold, the user's access level may be reduced (e.g., the amount of funds for withdrawal may be limited), or eliminated. Further, if the risk is above a threshold, the processor 404 may alert authorities or employees of the financial institution. In some embodiments, each level of a transaction requires a higher level of security, e.g., one level may be required to determine the current balance and a higher level may be required to make a withdrawal. In such an embodiment, the processor 404 returns to step 506 to receive additional data about the user.

Figure 6:
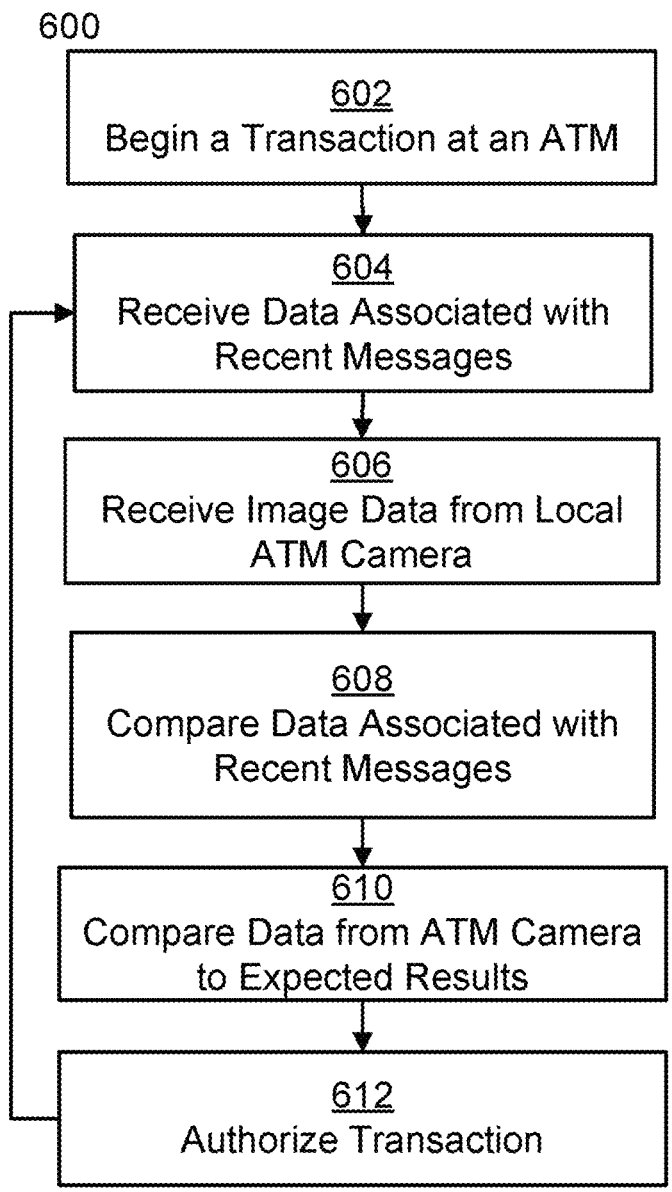
FIG. 6 is another example flow chart of method steps for dynamic bio-behavioral authentication according to one embodiment of the present disclosure.

FIG. 6, which is another example flow chart of method steps for dynamic bio-behavioral authentication according to one embodiment of the present disclosure. In some embodiments, the steps in FIG. 6 may be implemented in program code that is executed by a processor, for example, the processor in a general purpose computer, a mobile device, or a server. In some embodiments, these steps may be implemented by a group of processors. In some embodiments one or more steps shown in FIG. 6 may be omitted or performed in a different order. Similarly, in some embodiments, additional steps not shown in FIG. 6 may also be performed. The steps below are described with reference to components described above with regard to system 400 shown in FIG. 4.

The method 600 begins at step 602 when the processor 404 begins a transaction. The transaction comprises a transaction between a user of mobile device 452 and access device 402, which, in this embodiment, comprises an ATM. In other embodiments, access device 402 may comprise a kiosk, a desktop computer, a server computer, or other device.

At step 604, the processor 404 receives data associated with recent messages from the mobile device 452. The data associated with recent messages comprises data collected by sensor 464 and stored in observation module 458 by processor 404. The data may comprise, e.g., the people to which the user sent messages or emails over a certain period of time (e.g., 12-hours, 1-day, 1-week). This data is then transmitted to access device 402 via a network connection.

Next, at step 606, the processor 404 receives image data from a local ATM camera. The local ATM camera comprises a camera configured to capture one or more images of the user during the transaction.

Then, at step 608, the processor 404 compares the recent message data to historical measurements. For example, the processor 404 compares the messages the user has sent or received over a pre-set period to historical data 408 stored in memory 406. For example, the processor determines if the user has continued to send messages to the same people, or if the user is now sending messages to an entirely new group of people. This may indicate that the user is not the actual account holder, e.g., that someone has stolen the user's identity or mobile device.

Next, at step 610, the processor 404 compares the captured image to expected results. For example, the processor 404 may use facial recognition software to compare the captured image to historical data 408 stored in memory 406. Based on this comparison the processor 404 may determine that the user is the account holder. Further, in some embodiments, the processor 404 may determine if there are additional people near the user, e.g., a person directly behind the user, as this may indicate the likelihood of a robbery.

Then, at step 612, the processor 404 authorizes the transaction level. For example, the processor may determine that comparison in steps 608 and 610 indicate a high likelihood that the user is the account holder (e.g., the data associated with recent messages and the image analysis both match the expected values). Further, the analysis at step 610 may indicate a low risk of robbery. In some embodiments, if the comparison at step 608 or analysis at step 610 is within a threshold, the user's access level may be reduced (e.g., the amount of funds for withdrawal may be limited), or eliminated. Further, if the risk is above a threshold, the processor 404 may alert authorities or employees of the financial institution. In some embodiments, each level of a transaction requires a higher level of security, e.g., one level may be required to determine the current balance and a higher level may be required to make a withdrawal. In such an embodiment, the processor 404 returns to step 606 to receive additional data about the user.

There are numerous advantages of dynamic bio-behavioral authentication. Embodiments described herein are more secure than traditional security methods, as it is exceedingly difficult to spoof a user's behavior patterns, as doing so may require "walking a mile" in the user's shoes. Further, embodiments discussed herein are more secure than other methods of security, such as fingerprint detection. A fingerprint can be copied. However, when a fingerprint is combined with the user data described herein, it is made more difficult for the wrong user to gain access to sensitive information or assets.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. An automated teller machine comprising:
   a sensor;
   a network interface; and
   a processor configured to:
   receive, during a transaction at the automated teller machine, user data from the sensor configured to monitor user movement information during the transaction, wherein the transaction comprises a plurality of levels;
   receive, via the network interface, user data from a mobile device;
   receive, via the network interface, user heart rate data during the transaction;
   apply a weight to one or more parameters of the user data from the mobile device;
   apply a weight to the user movement information;
   determine a risk of a fraudulent transaction based on a comparison of the weighted user movement information from the sensor, the weighted user data from the mobile device, and the user heart rate data to expected parameters;
   determine that the risk of the fraudulent transaction is below a threshold; and
   allow access to a first level of the plurality of levels to access a secure resource at the automated teller machine based on the risk of the fraudulent transaction being below the threshold, and wherein the processor is configured to perform a new comparison of the one or more parameters of the weighted user data from the mobile device to expected parameters prior to granting access to each level of the plurality of levels of the transaction.

2. The automated teller machine of claim 1, wherein the processor is configured to perform another new comparison of the user movement information from the sensor to expected parameters prior to granting access to each level of the plurality of levels of the transaction.

3. The automated teller machine of claim 1, wherein the user data from the mobile device further comprises fingerprint data.

4. The automated teller machine of claim 3, wherein the user data from the mobile device is embedded in the fingerprint data.

5. The automated teller machine of claim 1, wherein the user data from the mobile device comprises data associated with one or more of the user's level of activity or blood pressure.

6. The automated teller machine of claim 1, wherein the user data from the mobile device comprises data associated with a past behavior of a user.

7. The automated teller machine of claim 1, wherein the user data comprises data associated with one or more of the user's: recent emails, recent messages, or recent calls.

8. The automated teller machine of claim 1, wherein the processor is further configured to request additional user data based on the determined risk.

9. A method comprising:
 receiving, during a transaction at an automated teller machine, user data from a sensor configured to monitor user movement information during the transaction, wherein the transaction comprises a plurality of levels;
 receiving, via a network interface, user data from a mobile device;
 receiving, via the network interface, user heart rate data during the transaction;
 applying a weight to one or more parameters of the user data from the mobile device;
 applying a weight to the user movement information;
 determining a risk of the fraudulent transaction based on a comparison of the weighted user movement information from the sensor, the weighted user data from the mobile device, and the user heart rate data to expected parameters;
 determining that the risk of a fraudulent transaction is below a threshold; and
 allowing access to a first level of the plurality of levels to access a secure resource at the automated teller machine, and performing a new comparison of one or more parameters of the weighted user data from the mobile device to expected parameters prior to granting access to each level of the plurality of levels of the transaction.

10. The method of claim 9, further comprising performing another new comparison of the user movement information from the sensor to expected parameters before granting access to a subsequent level relative to an initial level of the transaction.

11. The method of claim 9, further comprising receiving user data that comprises fingerprint data.

12. The method of claim 9, further comprising receiving user data that comprises data associated with one or more of the user's level of activity or blood pressure.

13. The method of claim 9, further comprising receiving user data that comprises data associated with a past behavior of a user.

14. The method of claim 9, further comprising requesting additional user data based on the determined risk.

15. A non-transitory computer readable medium having computer-executable instructions embodied therein that, when executed by at least one processor of a computing system, cause the computing system to perform operations, the operations comprising:
 receiving, during a transaction at an automated teller machine, user data from a sensor configured to monitor user movement information during the transaction, wherein the transaction comprises a plurality of levels;
 receiving, via a network interface, user data from a mobile device;
 receiving, via the network interface, user heart rate data during the transaction;
 applying a weight to one or more parameters of the user data from the mobile device;
 applying a weight to the user movement information;
 determining a risk of a fraudulent transaction based on a comparison of the weighted user movement information from the sensor, the weighted user data from the mobile device, and the user heart rate data to expected parameters;
 determining that the risk of the fraudulent transaction is below a threshold; and
 allowing access to a first level of the plurality of levels to access a secure resource at the automated teller machine, and performing a new comparison of one or more parameters of the weighted user data from the mobile device to expected parameters prior to granting access to each level of the plurality of levels of the transaction.

16. The non-transitory computer readable medium of claim 15, wherein the operations further comprise performing a new comparison of the user movement information from the sensor to expected parameters before granting access to a subsequent level relative to an initial level of the plurality of levels of the transaction.

17. The non-transitory computer readable medium of claim 15, wherein the operations further comprise receiving user data that comprises data associated with one or more of the user's level of activity or blood pressure.

* * * * *